United States Patent [19]

Link et al.

[11] Patent Number: 4,636,365

[45] Date of Patent: Jan. 13, 1987

[54] REACTOR FOR CATALYTICALLY INDUCED OR PROMOTED REACTIONS

[75] Inventors: Heinz Link, Zell; Karl-Heinz Schrenker, Tittmoning, both of Fed. Rep. of Germany

[73] Assignee: Linde Aktiengesellschaft, Wiesbaden, Fed. Rep. of Germany

[21] Appl. No.: 674,731

[22] Filed: Nov. 26, 1984

Related U.S. Application Data

[63] Continuation-in-part of Ser. No. 438,808, Nov. 3, 1982, abandoned.

[30] Foreign Application Priority Data

May 6, 1982 [DE] Fed. Rep. of Germany ....... 3217066

[51] Int. Cl.[4] .......................... B01J 8/02; F28D 7/02; F28F 9/02
[52] U.S. Cl. .................................... 422/201; 165/71; 165/104.15; 165/156; 165/158; 422/148; 422/219
[58] Field of Search ............... 422/143, 146, 148, 201, 422/213, 216, 219; 165/104.15, 104.18, 156, 158, 163, 71, 104.17

[56] References Cited

U.S. PATENT DOCUMENTS

| | | | |
|---|---|---|---|
| 1,892,778 | 1/1933 | Black | 165/163 X |
| 2,196,496 | 4/1940 | Hamm | 422/201 X |
| 2,400,194 | 5/1946 | Day et al. | 422/216 X |
| 3,458,289 | 7/1969 | King et al. | 422/148 |
| 3,784,361 | 1/1974 | Kuber et al. | 422/148 X |
| 4,099,926 | 7/1978 | Gütlhuber et al. | 422/201 X |
| 4,207,944 | 6/1980 | Holtz et al. | 165/158 X |
| 4,274,480 | 6/1981 | McGee | 165/158 X |
| 4,339,413 | 7/1982 | Lahne et al. | 422/191 |
| 4,357,304 | 11/1982 | Pegels et al. | 422/116 X |

FOREIGN PATENT DOCUMENTS 1274532  9/1960  France .................................. 165/156

Primary Examiner—Barry S. Richman
Assistant Examiner—Brion P. Heaney
Attorney, Agent, or Firm—Karl F. Ross; Herbert Dubno

[57] ABSTRACT

A reactor, especially for exothermic reactions like methanol synthesis, comprises a tube bundle in which the coiling tube extends through a body of particles to facilitate the discharge of depleted particles from the catalyst space and to increase the pressure resistance of the assembly, the tube sheet at the opposite ends of the bore being convex inwardly. The tube bundle has a helical configuration and the tube sheets are hemispherical in shape in the region where the tubes intersect with the tube sheet. The tubes intersect the bottom tube sheet in radial rows of openings wherein the rows are spaced to facilitate the discharge of catalyst particles.

9 Claims, 4 Drawing Figures

REACTOR FOR CATALYTICALLY INDUCED OR PROMOTED REACTIONS

CROSS REFERENCE TO RELATED APPLICATION

This application is related to our copending application Ser. No. 438,808 filed Nov. 3, 1982 (now abandoned) of which this application is a continuation-in-part.

FIELD OF THE INVENTION

Our present invention relates to a reactor for catalytically induced or catalytically promoted reactions and, more particularly, to a tube-bundle reactor for carrying out chemical reactions in the presence of a particulate or granular catalyst.

BACKGROUND OF THE INVENTION

It is known (see U.S. Pat. Nos. 4,263,260 and 4,339,413 and patents in the corresponding class of the *Manual of Patent Examining Classification*) to provide catalytic reactors, especially for exothermic reactions, but also for endothermic reactions, in which the catalyst bed is formed by particles, granules or shaped bodies of a catalyst material and this bed is penetrated in whole or in part by tubes, e.g. for heating or cooling the bed and/or for feeding reactants to the bed or removing reaction products therefrom.

Such tube-bundle reactors may make use of rectilinear tubes or tubes defining helical or spiral patterns and forming a tube bundle in the interstices of which the catalyst bed can be provided.

Typical of the exothermic and endothermic catalytic reactions, which can be carried out in such reactors, is methanol synthesis, methanization and ammonia synthesis.

In general, the catalytic reaction occurs on the surface of the subdivided catalyst material with the excess heat thereby generated being conducted away by a cooling fluid circulated through the tubes or with heat required to trigger the reaction or to maintain it being delivered by a heating fluid circulated through these tubes.

The tubes thus serve to abstract excess heat or to supply heat necessary for the desired reaction so that by-product formation and side reactions are suppressed.

At the upper end lower ends of the reactor, the tubes of the tube bundle generally terminate at so-called tube sheets or in other manifold structures which allow the cooling or heating fluid to be distributed to the tubes at an inlet side of the tube bundle and depleted fluid to be collected at an outlet side of this tube bundle.

The tube sheet, at least at the bottom of the reactor, generally forms a support for the catalyst bed.

Reactors of this type have been found to be highly efficient and indeed are widely used. From time to time, however, the operation of such reactors must be interrupted, e.g. to replace a catalyst whose activity has deteriorated beyond an economical degree. In this case, the depleted catalyst must be discharged from the housing and replaced by fresh catalyst.

This discharge of the depleted catalyst poses problems. Although the interstices and openings provided for the discharge of the catalyst and the movement of the particles between the tubes of the tube bundle generally are sufficiently large to enable the particles to pass through a more or less friction less flow, in practice the tubes, especially in the region of the discharge opening, tend to obstruct such movement.

For effective operation of the catalytic reactor and for various structural reasons, it is imperative that the turns of the tube bundle or the layers of the tube bundle be as close together as possible and ultimately of the same order of magnitude as the diameter of the particles of the catalyst bed which are distributed in the interstices between the tubes.

When the discharge opening in the housing is unblocked to discharge the catalyst bed, the initial flow of the catalyst particles is relatively free of pressure drops from the catalyst above, which is no longer supported by the catalyst particles below. The particles ten to bridge across the tubes and these bridges obstruct the further flow of the catalyst particles.

The discharge of catalysts from such a reactor must be continuously assisted by mechanical or manual means, thereby making the discharge process labor intensive and time-consuming. This of course means that operation of the catalytic reactor is unduly complicated and expensive.

OBJECTS OF THE INVENTION

It is the principal object of the present invention to provide a reactor of the aforedescribed type and for exothermic or endothermic reactions whereby the discharge and replacement of the catalyst packing or bed is facilitated.

Another object of this invention is to provide an improved catalytic reactor which eliminates some of the problems hitherto encountered with earlier reactors as described above, and paticularly requires less time and attention for effecting discharge or replacement of the catalyst filling.

Still another object of the present invention is to provide an improved catalytic reactor and particularly a catalytic reactor of the straight tube or coiled tube bundle type whereby the passage of catalyst particles from the intestices of the tube bundle is facilitated.

It is also an object of the invention to provide an improved reactor of the type described which extends the principles of our prior application mentioned above.

SUMMARY OF THE INVENTION

These objects and others which will become more readily apparent hereinafter are attained, in accordance with the present invention, by providing at least one of the tube sheets with an inwardly convex or outwardly concave curvature, the "inward" and "outward" directions being taken with reference to the reaction compartment or space.

While the flow of catalyst particles from the reaction space can be greatly improved when either of the tube bottoms is of such inwardly convex or outwardly concave curvature, preferably at least the lower tube sheet has such a curvature or configuration.

The outlet in the housing for the catalyst particles is preferably located substantially at the level of the lowermost portion of the lower tube sheet or manifold or therebelow.

The convex curvature of the lower tube sheet toward the carrier of the reaction space appears to direct the descending catalyst particles outwardly and thereby channel them toward regions in which the tubes are somewhat more widely spaced than is the case for the tubes along the more inner regions of this space.

We have found, most surprisingly, that all other things being equal, simply providing the lower tube sheet or manifold with an inwardly convex configuration, it is possible to reduce substantially the time required for discharging the catalyst particles from the reaction space and thereby substantially reducing any tendency for the catalyst particles to be held back within this space.

The curved manifold or tube sheet structure also has been found to have another important advantage, namely greater strength and resistance to pressure. Thus, for a given pressure stability of a tube bottom, it is possible to reduce the thickness thereof by comparison with earlier systems using planar tube bottoms, thereby reducing the capital cost of the reaction vessel.

According to a feature of the invention, the or each tube sheet or manifold has approximately the configuration of a spherical segment and in a preferred mode, each tube sheet or manifold is hemispherical.

Advantageously, the apex of the manifold or tube sheet is located along the axis of the reactor. It has been found to be advantageous, moreover, to have the tubes of the tube bundle open into the tube sheet or manifold along meridians through the apex. In this configuration, as seen in a vertical projection, the tube ends have a starlike or spokelike pattern or orientation, i.e. the spacing between neighboring tubes at the same radial distance from the axis of the reactor increases outwardly from the axis. This has also been found to promote or facilitate the flow of the catalyst particles from the tube bundle and the reaction space.

According to the best mode embodiment of the invention, above the lower tube bottom or manifold, a cap is provided in the region of the apex, this cap being frustoconical with a half angle, preferably of a maximum of 50° and most preferably with a half angle of up to 25°.

With this configuration, the descending catalyst particles are directed in the region of the lower tube sheet or manifold against the surfaces of the latter in a shallow manner rather than with a steep inclination.

According to yet another feature of the invention, the upper tube sheet or manifold forms the lower bottom or dome of a vapor drum integrated into the reactor and forming a vapor trap from which the vapor phase is separated from the cooling liquid and the latter is recirculated to the lower manifold.

This arrangement has been found to be highly advantageous when the liquid circulated through the reactor partially vaporizes.

In general the vapor trap or separator is provided as a unit separate and distinct from the reaction vessel. This has the disadvantage not only of greater cost because separate units must be used but also requires that the entire apparatus occupy more space. When the separator is built into the reactor it does not have to be dimensioned to resist as great a pressure as would otherwise be the case since within the vessel it may be subjected to higher pressures along its outer surfaces as well. The connections between the separator vessel and the reaction space are simplified and operating instabilities resulting from phase separation within the pipes are also eliminated.

It has been found that best results are obtained when the tube spacing between the tube end at a given radial distance from the axis increases from 1.5 times to a maximum of 15 times the particle diameter of the catalyst from the axis of the reaction vessel outwardly.

A number of closable catalyst outlets can be provided at the bottom of the reactor and are located in the bottom dome so as to have their axes inclined downwardly and outwardly. These outlets can be located close to the cylindrical downwardly extension of the lower manifold or tube sheets and are substantially equispaced or symmetrically deposited about the axis of the reactor.

Between each two such outlets, we provide a roof-shaped gas-permeable screen or grate whose apex line or crest extends radially between the lower tube manifold or sheet and the reactor wall and whose inclined flanks are inclined outwardly and downwardly towards the outlets deposited between the roof-shaped members. This ensures that no catalyst particles will remain between the outlets or catalyst discharge.

Preferably the crests of the roof-shaped members are inclined upwardly and outwardly from the lower tube sheet or manifold.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
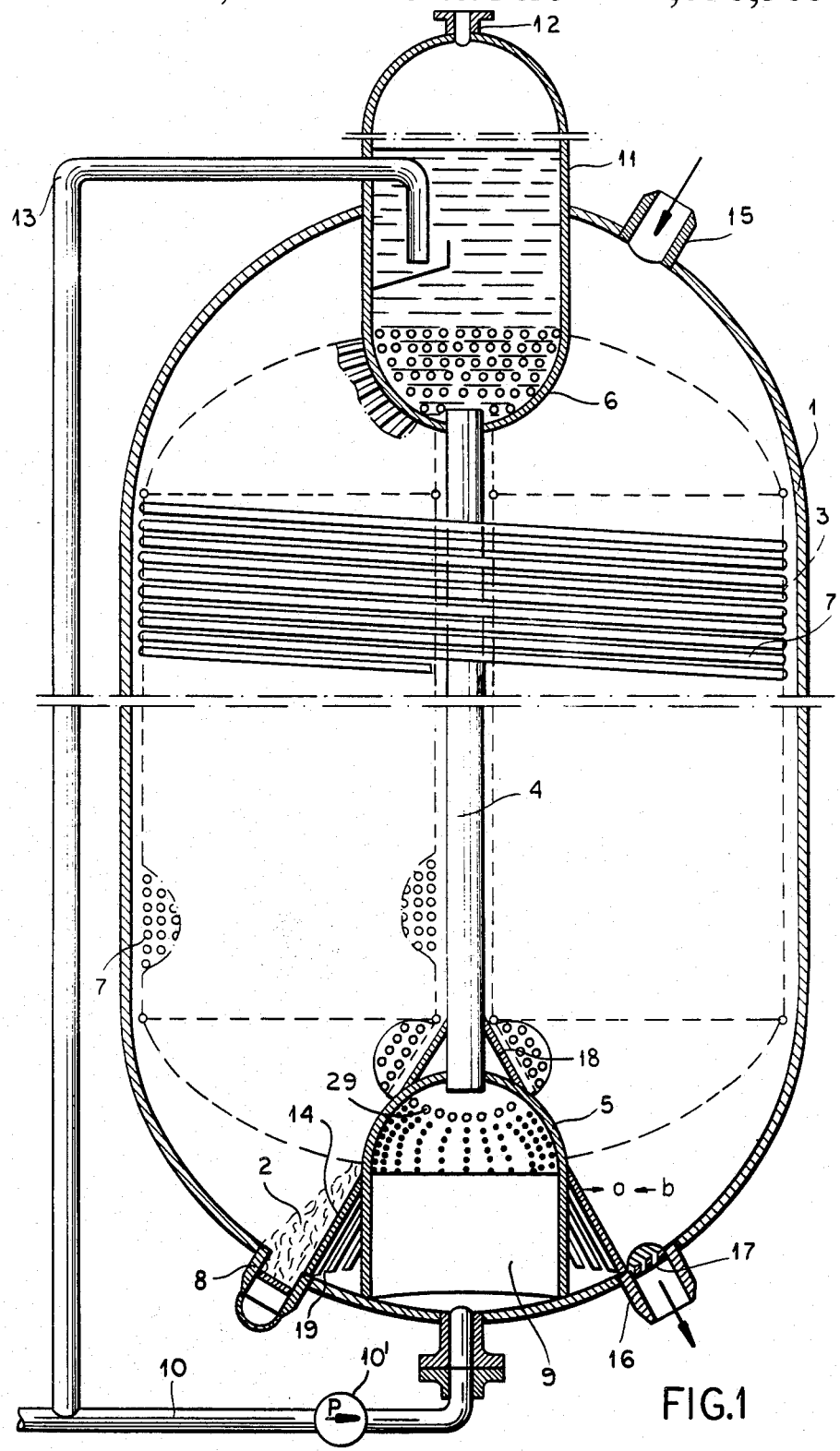
FIG. 1 is a vertical cross sectional view through a reactor for endothermic catalytic reactions according to the invention.

The reactor shown in FIG. 1 can be utilized for methanol synthesis (see the aforementioned patents) and comprises a reactor housing 1 enclosing a reaction chamber 7 which is filled with catalyst particles of a given diameter b which has been identified by the reference numeral 2.

Within the bed formed by these catalyst particles, cooling tubes 3 are received to abstract the rection heat. These tubes may run rectilinearly parallel to the vertical axis of the reactor but preferably, as has been illustrated, form helical coils around a core tube 4 which is sealed and serves only as a structural member.

Each helical tube 3 terminates at a respective hole in the lower tube sheet or manifold 5 and in the upper tube sheet or manifold 6.

According to the invention the tube sheets 5 and 6 are concave outwardly from the reaction chamber 7 or convex inwardly, i.e. toward the reaction space, the lower manifold or tube sheet 5 serving simultaneously as a support for the packing.

In the region of its apex, a frustoconical cap 18 is provided on the lower tube sheet 5, this cap having its upper end sealed, e.g. by a weld bead, to the core tube 4. The tubes 3 communicate with the tube sheet 5 below the cap 18. The cap 18 tends to direct the particles outwardly when they flow downwardly and thus facilitates discharge of the catalyst bed.

Below the lower edge of the lower tube sheet 5, there is provided an outlet opening 8 in the bottom of reactor housing 1, this outlet being closed during operation of the reactor and being opened to discharge the catalyst particles 2 when depletion of the catalyst requires it. A frustoconical grid or grate 14, directing the particles to the opening 8, can be provided below the lower edge of the tube sheet 5 when this lower edge is connected to the housing inwardly of the opening 8. When the tube sheet diverges outwardly to meet the wall 19 at this opening, a separate grate is not required.

The reaction chamber 7 is provided with an inlet 15 for the reactants and an outlet 16 for the reaction products, the outlet 16 being provided with a sieve 17 which prevents discharge of the catalyst through this outlet.

A chamber 9 formed by the tube sheet 5 is connected to a feed pipe 10 for the cooling water which is distributed from chamber 9 to the tubes 3. The heated water is collected from tubes 3 by the upper tube sheet of manifold 6 and the latter simultaneously serves as the lower bottom or dome of a vapor or steam trap 11 separating the steam from the water and integrated into the reactor housing 1.

The cooling water partially evaporates and the steam is permitted to rise above the liquid level in the trap 11 which functions as a drum separating the liquid and gas phases from one another.

The fitting 12 at the upper end of the trap 11 discharges the steam while a tube 13 draws water from the body of liquid in this trap for circulation via pump 10' in the feed water line 10.

Figure 2:
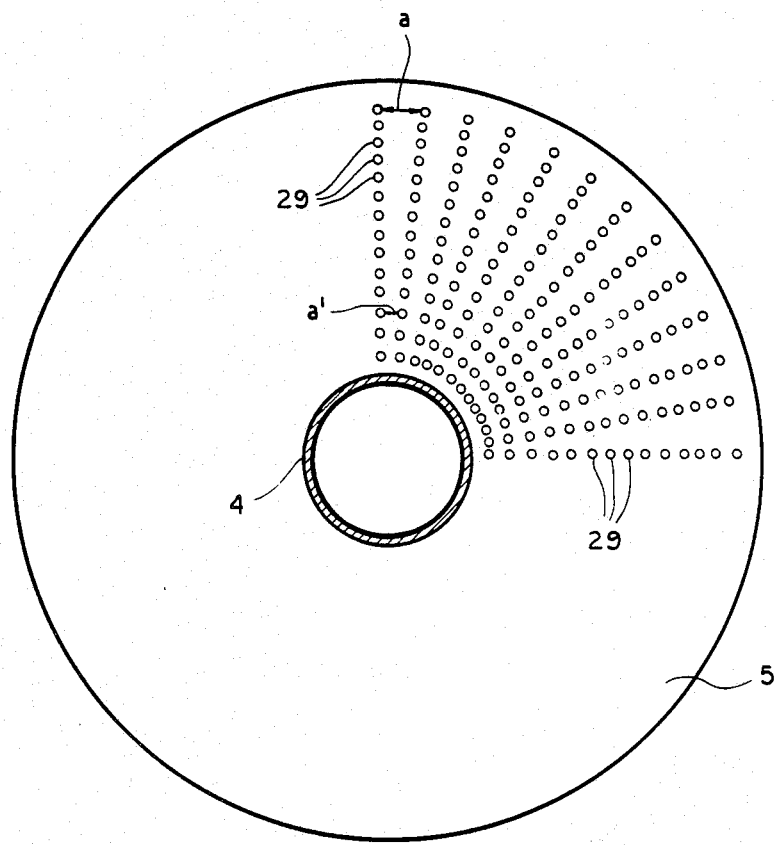
FIG. 2 is a plan view of a tube sheet or manifold in accordance with the invention.

FIG. 2 shows one of the tube sheets or manifolds in an enlarged plan view and it can be seen that the openings 29 in the tube sheet at which the ends of tube 3 terminate lie along radial lines which radiate from the apex of the tube sheet 5, for example.

With this arrangement, the spacing of tubes equidistant from the axis increases from a value a' to a value a with increasing distance from the apex to facilitate the flow of the particles along the tube sheet 5 as they are discharged. The spacing increases from a value of 1.5 times the particle diameter b to a spacing of 15 times the particle diameter b from the innermost circle of tubes to the outermost circle of tubes.

Figure 3:
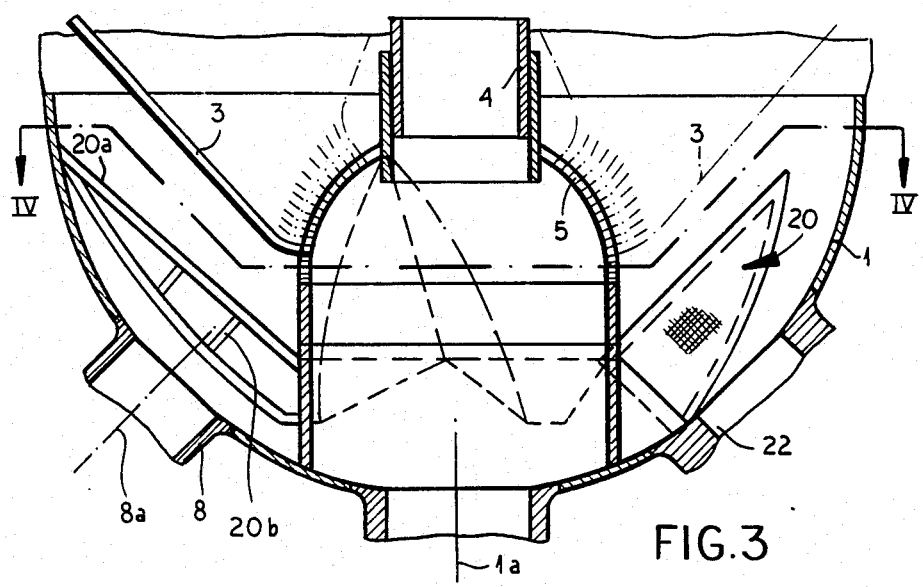
FIG. 3 is a diagrammatic vertical section through the lower portion of a reactor according to another embodiment of the invention.
Figure 4:
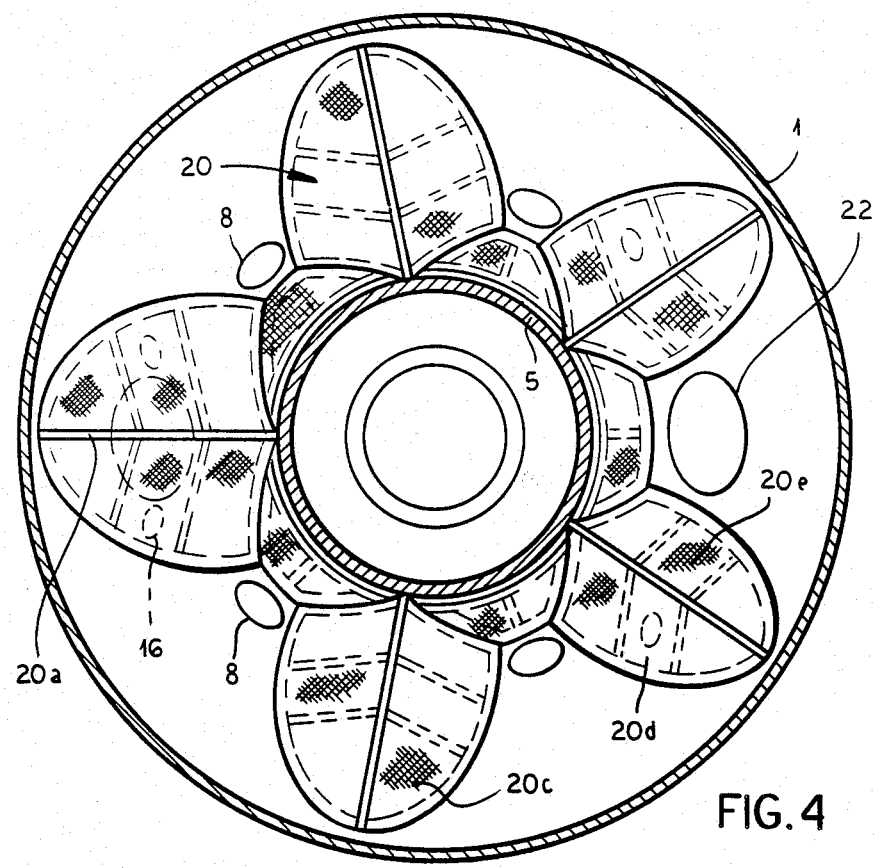
FIG. 4 is a generally horizontal section taken along the line IV—IV of FIG. 3.

As can be seen from FIGS. 3 and 4, a plurality of closable outlets 8 can be provided at the bottom of the reactor, these outlets having axes 8a which are inclined downwardly and outwardly with respect to the reactor axis 1a.

In this case, each outlet 8 is located between a pair of generally radially extending roof-shaped members 20 whose crests 20a are inclined upwardly and outwardly along radii from the lower tube sheet 5 to the wall of the reactor housing 1. The crests form part of a framework 20b covered by sheets 20c of screening located above fluid outlets 16. A manhole 22 can also be provided for access.

The flanks 20d and 20e of each member 20 are inclined downwardly and outwardly to form surfaces which radially shed the catalyst particles and ensure that no particles will remain between the outlets 8 upon discharge of the catalyst from the reactor.

We claim:
1. A reactor for catalytic reactions comprising:
   a vessel having a wall, an upper portion, a lower portion, an upright axis and defining a space for receiving catalyst particles, said vessel provided with means for introducing reactants into said space and means for removing a reaction product from said space;
   a mass of catalyst particles in said space;
   a helical tube bundle of generally annular configuration extending through said space and said mass for passing a fluid through the tubes of said tube bundle for indirect heat exchange with said catalyst particles, said tube bundle having interstices between adjacent tubes and said interstices containing said catalyst particles;
   an upper tube sheet positioned within said upper portion of said vessel, said upper tube sheet having an upright cylindrical portion and a hemispherical portion located beneath said cylindrical portion, said hemispherical portion being convex with respect to said space, said upper tube sheet communicating with the tubes of said tube bundle through openings located only within said hemispherical portion of said upper tube sheet, said upper tube sheet thereby forming an upper manifold for said tube bundle;
   a lower tube sheet positioned within said lower portion of said vessel, said lower tube sheet having an upright cylindrical portion and a hemispherical portion located above said cylindrical portion of said lower tube sheet, said hemispherical portion of said lower tube sheet being convex with respect to said space and being provided with openings which communicate with the tubes of said tube bundle thereby forming a lower manifold for said tube bundle, said openings of said lower tube sheet being oriented in equally spaced rows radiating from the apex of said hemispherical portion of said lower tube sheet, said rows diverging downwardly from the apex of said hemispherical portion of said lower tube sheet whereby the spacing between said rows increases as said rows radiate downwardly from the apex of said hemispherical portion of said lower tubesheet, said tube bundle having an inner diameter which is less than the diameter of the cylindrical portion of either of said tube sheets, said tube bundle having an outer diameter which is greater than the diameter of the cylindrical portion of either of said tube sheets, said tubes of said tube bundle being connected to each of the tube sheets substantially perpendicular to the hemispherical portions thereof;
   outlet means within said vessel at a position below said hemispherical portion of said lower tube sheet for removing catalyst particles from said space;
   and means for circulating a heat exchange fluid through the tubes of said tube bundle.

2. The reactor defined in claim 1 wherein the apex of each of the hemispherical portions of said tube sheets lie along said upright axis of said vessel, said axis being vertical.

3. The reactor defined in claim 1, further comprising a frustoconical cap mounted on the lower tube sheet around the apex thereof.

4. The reactor defined in claim 1, wherein said upper tube sheet forms the lower bottom of a steam-separating receptacle integrated into said vessel.

5. The reactor defined in claim 1 wherein the openings in each of said tube sheets are located in concentric circular rows spaced outwardly from the apex of the hemispherical portion of each of said tube sheets wherein adjacent openings of the circular row closest to the apex of each of said hemispherical portions are spaced apart by a distance of substantially 1.5 times the diameter of said catalyst particles and the spacing between adjacent openings of successive circular rows increases progressively to a maximum spacing of 15 times the diameter of said catalyst particles.

6. The reactor defined in claim 1, further comprising a core connecting said tube sheets, said tube bundle extending around said core.

7. The reactor defined in claim 1 wherein said outlet means includes a plurality of outlets provided in spaced-apart relationship in the lower portion of said vessel, said outlets being positioned outwardly from said lower tube sheet and below said tube bundle.

8. The reactor defined in claim 7, further comprising a plurality of fluid-permeable members positoned between each two adjacent outlets each of said fluid-permeable members having a crest extending radially between said lower tube sheet and the wall of said vessel and flanks extending downwardly and outwardly from said crest, and said means for removing a reaction product includes a plurality of outlet ports in the lower portion of said vessel wherein each of said fluid-permeable members is located over one of said outlet ports in said wall of said vessel.

9. The reactor defined in claim 8 wherein said crests are inclined upwardly and outwardly with respect to the axis.

* * * * *